United States Patent [19]
Andres

[11] 3,838,746
[45] Oct. 1, 1974

[54] RETAINING INSTALLATION FOR THE PASSENGERS OF VEHICLES, ESPECIALLY MOTOR VEHICLES

[75] Inventor: Rudolf Andres, Sindelfingen, Germany

[73] Assignee: Daimler-Benz Aktiengesellschaft, Stuttgart, Germany

[22] Filed: Nov. 30, 1972

[21] Appl. No.: 310,885

[30] Foreign Application Priority Data
Nov. 30, 1971 Germany............................ 2159265

[52] U.S. Cl............................ 180/82 C, 280/150 SB
[51] Int. Cl.............................................. B60k 27/08
[58] Field of Search.............. 180/82 C; 280/150 SB

[56] References Cited
UNITED STATES PATENTS
| | | | |
|---|---|---|---|
| 2,880,815 | 4/1959 | Apfelbaum................ | 280/150 SB X |
| 3,220,747 | 11/1965 | Marion.......................... | 280/150 SB |
| 3,484,134 | 12/1969 | Townsend...................... | 280/150 SB |

*Primary Examiner*—M. Henson Wood, Jr.
*Assistant Examiner*—Gene A. Church
*Attorney, Agent, or Firm*—Craig & Antonelli

[57] ABSTRACT

A retaining installation for the passengers of vehicles, especially of motor vehicles, in which the retaining members are substantially not supported at the body of the passengers under any great force during normal driving operation but are supported at the bodies of the passengers at the instant of a collision under still barely tolerable prestress; the retaining members are thereby displaced automatically in the direction toward the passengers upon actuation of brake elements with the build-up of a prestress.

19 Claims, 2 Drawing Figures

RETAINING INSTALLATION FOR THE PASSENGERS OF VEHICLES, ESPECIALLY MOTOR VEHICLES

The present invention relates to a retaining installation for the passengers of vehicles, especially of motor vehicles, in which the retaining or holding-back members are substantially not supported with any great force at the body of the passengers during normal driving operation but at the instant of a collision are supported at the body of the passengers under barely still tolerable prestress.

Known retaining or holding-back installations, such as safety belts or movable impact surfaces, can become fully effective only if they connect already at the beginning of the impact body of the vehicle passengers with the vehicle with a force which is as large as possible and is just barely still tolerable. Such a prestress, however, cannot be exacted from and expected to be accepted by the vehicle passengers in normal driving operation. For that reason, it is already proposed in the German Offenlegungsschrift 1,630,477 to bring the retaining or holding-back mechanism into a position protecting the passengers only at the instant of the contact of the vehicle with an obstacle. Sensors at places of probable contact points thereby serve as triggering elements.

This prior art proposal entails the disadvantage that only fractions of a second remain between the impact of the vehicle against an obstacle and the reaction effects conditioned thereby on the vehicle passengers so that the retaining or holding-back mechanisms can be brought only with difficulty and with high constructive expenditures into a protecting position within a short period of time. In the course of many accidents, the proposed device therefore cannot become effective at all because, for example, in case of a skidding of the vehicle with subsequent rolling-over, a response takes place only at the moment of the impact. Also, in case of a collision with a truck or another type of vehicle of special shape, an impact without contact of the triggering elements is very likely because of the under-running, i.e., because parts of the vehicle in question will run under parts of the relatively higher truck or the like.

It is the aim of the present invention to provide a retaining or holding-back installation which does not exhibit the described disadvantages and which additionally operates reliably with only slight technical expenditures.

Accordingly, a retaining or holding-back installation for the passengers of vehicles, especially of motor vehicles, is proposed in which the retaining or holding-back members are not supported with any substantial force against the body of the passenger during normal driving operation but are supported at the body of the passengers at the instant of a collision under barely still tolerable prestress, in which according to the present invention during the actuation of brake members, the retaining or holding-back members are displaced automatically in the direction toward the passengers under build-up of a prestress.

In one embodiment of the present invention, safety belts may be used as retaining members in which a predetermined prestress force which remains constant, is applied to at least one belt strap beginning with a predetermined brake force.

However, safety belts may also be used as retaining or holding-back members in which a prestress corresponding to the respective brake force is applied to at least one belt strap. The movement of the retaining or holding-back members may thereby take place by an auxiliary force which may be of mechanical, hydraulic, pneumatic or electrical nature or of a combination of two or more thereof.

With hydraulically actuated retaining or holding-back members, adjusting motors may be used which may be connected either directly or under interconnection of a conventional pressure converter or pressure transducer to the brake system of the vehicle.

Especially in vehicles with a servo-system independent of the brake system, it is appropriate to connect the adjusting motors to this system and to actuate the same in case of need by way of closure members which are preferably electrically actuated.

Injuries due to excessive belt forces can be avoided if the adjusting motor, in the sense of a belt-force limiting-means, limits to a desired value the belt force acting on the passengers in the course of an accident, when exceeding a predetermined force. However, additional belt-force limiting means of any conventional construction may also be connected in series in front of or behind the adjusting motor which limit the belt force to a predetermined value.

In order that the passengers can quickly leave the vehicle after an impact or injured passengers can be easily rescued, the applied prestress force can be decreased again with delay upon release of the brake force. This can be readily achieved with hydraulically actuated adjusting motors by a throttling of the returning oil flow.

Accordingly, it is an object of the present invention to provide a retaining installation for the passengers of vehicles, especially of motor vehicles, which avoids by simple means the aforementioned shortcomings and drawbacks encountered in the prior art.

Another object of the present invention resides in a holding-back installation for the passengers of vehicles, especially of motor vehicles which operates reliably by the use of relatively slight technical expenditures.

A further object of the present invention resides in a retaining or holding-back installation for the passengers of vehicles which assures that the passengers are connected with the vehicle at the beginning of the impact with as large as possible a force, still acceptable to the passengers.

Still another object of the present invention resides in a retaining mechanism for the passengers of vehicles, especially motor vehicles which is readied for performing its intended function in good time before the actual occurrence of the impact, taking into consideration that only a fraction of a second would otherwise be available for readying the mechanism.

Still another object of the present invention resides in a holding-back protective device for the passengers of motor vehicles which is simple in construction and utilizes relatively few additional parts.

Another object of the present invention resides in a protective retaining device for the passengers of motor vehicles which is highly effective in case of accidents without impairing the driving confort of the passengers during the normal drive of the vehicle.

These and other objects, features and advantages of the present invention will become more apparent from the following description when taken in connection with the accompanying drawing which shows, for purposes of illustration only, one embodiment in accordance with the present invention, and wherein.

Figure 1:
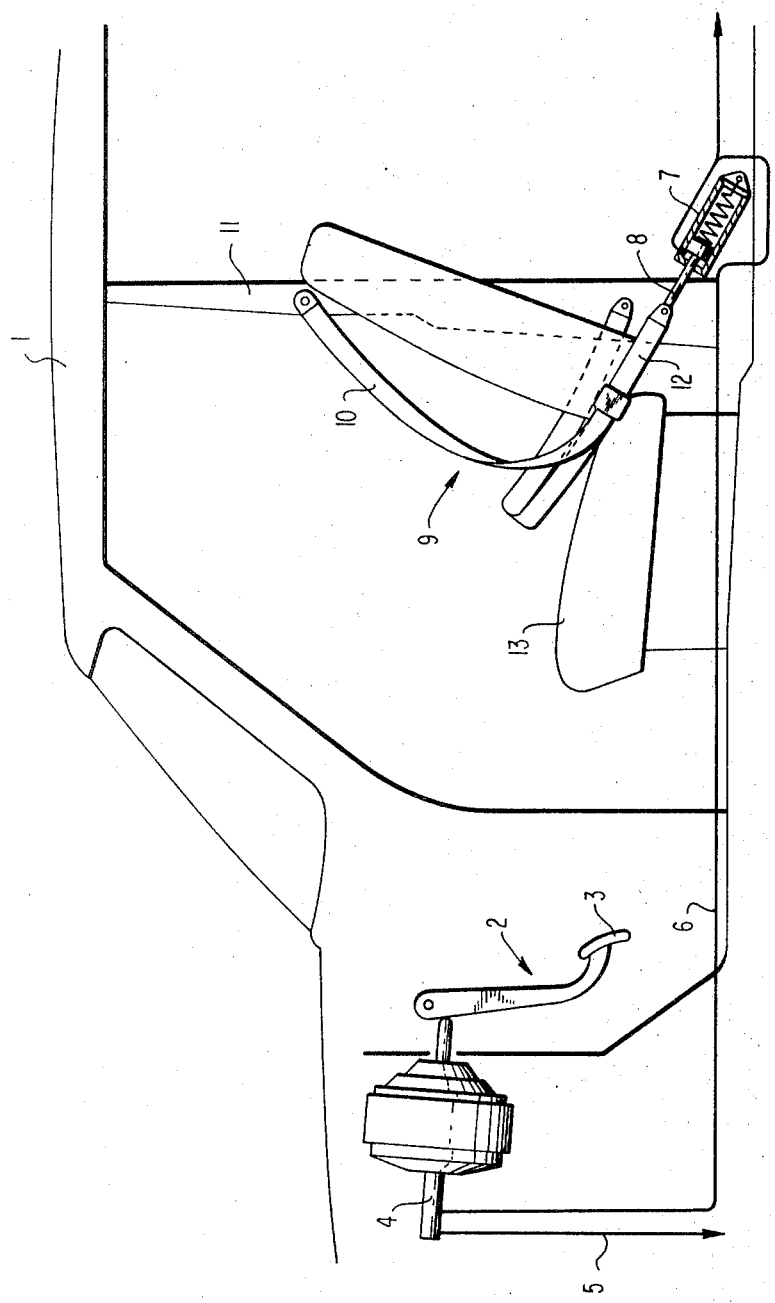
FIG. 1 is a somewhat schematic partial side view of a passenger motor vehicle equipped with a protective retaining installation in accordance with the present invention.

Referring now to the FIG. 1 of the drawing, reference numeral 1 designates therein a passenger motor vehicle which is only schematically shown therein. The brake pedal 3 serves as brake member generally designated by reference numeral 2. The brake pedal 3 acts on a servo-assisted master brake cylinder 4; a line 5 which starts from the master brake cylinder 4 leads to the wheel brake cylinders of the front wheels for the actuation of the latter in a conventional manner. A further line 6 leads to an adjusting or actuating motor 7 and from there also to the wheel brake cylinders of the rear wheels in a conventional manner not illustrated in detail. The piston rod 8 of the spring-loaded adjusting motor 7 acts on retaining or holding-back members generally designated by reference numeral 9 which represent a safety belt 10. The belt end 12 not secured at the door column 11 is tightened during inward movement of the piston rod 8 in the direction thereof whereby, in case of an occupied seat 13, the safety belt 10 supports itself at the body of the passenger under prestress.

Figure 2:
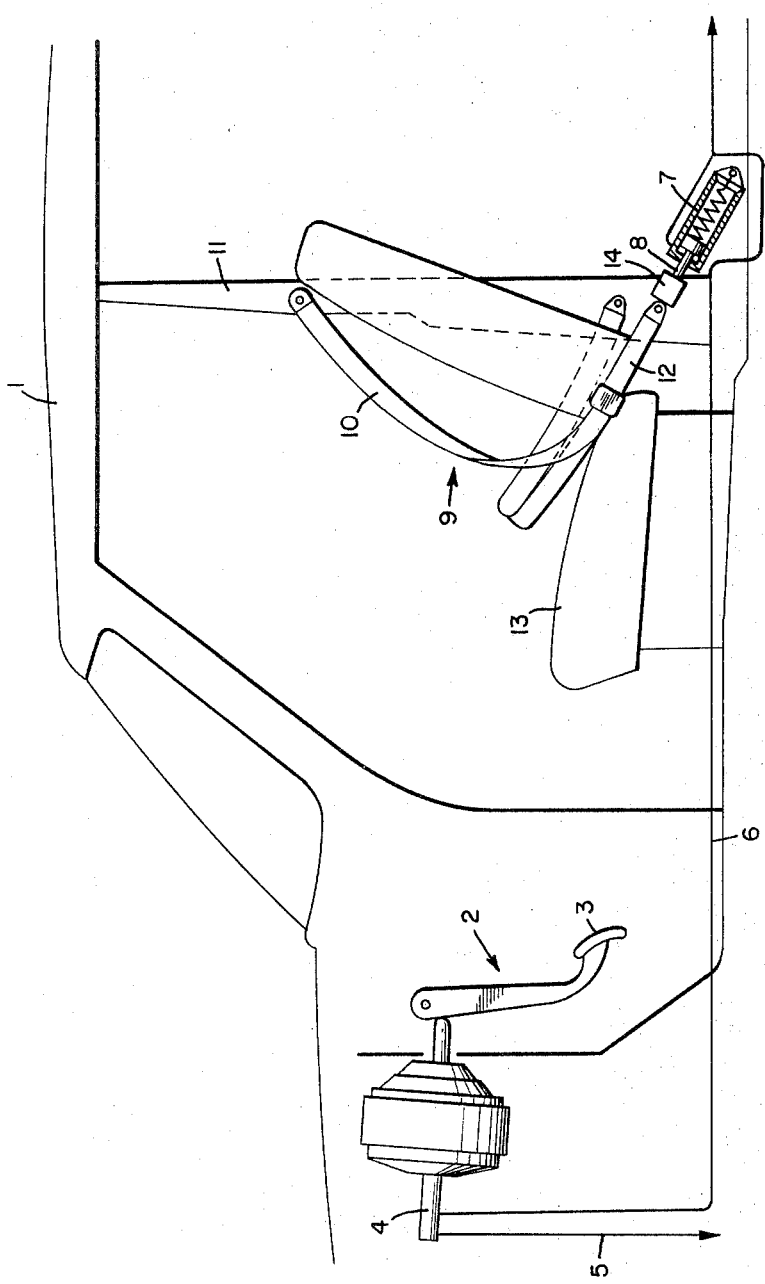
FIG. 2 is a somewhat schematic partial side view of a further embodiment of the present invention.

FIG. 2 illustrates a further embodiment of the retaining installation wherein a belt-force limiting means 14 is connected in series in front of the adjusting motor 7. This belt-force limiting means of any conventional construction and limits the belt force acting on the passengers to a predetermined value.

The discharge of the hydraulic fluid may take place by way of one or several throttling openings (not shown) of suitable cross section to permit the passengers to leave the vehicle rapidly after an impact, once the brake force is released. This throttling opening or openings thereby produce the necessary delay.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A retaining installation for vehicle passengers comprising
   retaining means for retaining passengers in a vehicle, said retaining means being supported by said passengers with substantially minimal forces during normal operation of said vehicle,
   brake means for applying braking forces to said vehicle, and
   control means operatively connected with said brake means for automatically displacing said retaining means toward said passengers such that an increasing prestress is applied to said passengers upon actuation of said brake means until a barely tolerable prestress is obtained on said passengers.

2. A retaining installation according to claim 1, wherein said vehicle is a motor vehicle.

3. A retaining installation according to claim 1, wherein said retaining means include safety belts in which a predetermined substantially constant prestress is applied to at least one belt strap at a predetermined brake force.

4. A retaining installation according to claim 1, wherein said retaining means include safety belts in which a prestress force correspondingly matched to a respective brake force is applied to at least one belt strap thereof.

5. A retaining installation according to claim 1, wherein said retaining means are displaced by an auxiliary force.

6. A retaining installation according to claim 5, wherein said retaining means are hydraulically actuated and adjusting motor means are used which are operatively connected with the said brake means.

7. A retaining installation according to claim 6, wherein said adjusting motor means are directly connected with said brake means.

8. A retaining installation according to claim 6, wherein said adjusting motor means are connected with said brake means by interposition of pressure converter means.

9. A retaining installation according to claim 6, wherein said control means includes a spring-loaded piston slidable within a cylinder housing, said piston being connected with one end of a belt of a safety belt system constituting said retaining means, and said cylinder housing being operatively connected with said brake means to displace the piston against the spring force upon actuation of said brake means.

10. A retaining installation according to claim 5, wherein a servo-system independent of the brake system are included, and adjusting motor means are used which are operatively connected with the servo-system.

11. A retaining installation according to claim 10, wherein said adjusting motor means are connected with the servo-system by electrically actuated closure means in case of need.

12. A retaining installation according to claim 1, wherein said retaining means are hydraulically actuated and adjusting motor means are used.

13. A retaining installation according to claim 12, wherein said adjusting motor means include a belt-force limiting means, said belt-force limiting means limiting the belt force acting on the passenger in case of an accident to a desired value when exceeding a predetermined value during the accident.

14. A retaining installation according to claim 12, wherein belt-force limiting means are connected in series with said adjusting motor means.

15. A retaining installation according to claim 14, wherein said belt-force limiting means applies a decreasing belt force with delay upon release of the belt force.

16. A retaining installation according to claim 15, further including discharge means for discharging a hydraulic actuating medium from the cylinder by way of throttling orifices.

17. A retaining installation according to claim 16, wherein said retaining means include safety belts in which a predetermined substantially constant prestress is applied to at least one belt strap at a predetermined brake force.

18. A retaining installation according to claim 16, wherein said retaining means include safety belts in which a prestress force correspondingly matched to a respective brake force is applied to at least one belt strap thereof.

19. A retaining installation according to claim 1, wherein said control means includes a spring-loaded piston slidable within a cylinder housing, said piston being connected with one end of a belt of a safety belt system constituting said retaining means, and said cylinder housing being operatively connected with said brake means to displace the piston against the spring force upon actuation of said brake means.

* * * * *